(12) United States Patent
Watanabe et al.

(10) Patent No.: US 11,118,700 B2
(45) Date of Patent: Sep. 14, 2021

(54) VALVE DEVICE AND FLUID CONTROL SYSTEM

(71) Applicant: FUJIKIN INCORPORATED, Osaka (JP)

(72) Inventors: Kazunari Watanabe, Osaka (JP); Tomohiro Nakata, Osaka (JP); Tsutomu Shinohara, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 0 days.

(21) Appl. No.: 16/613,572

(22) PCT Filed: May 25, 2018

(86) PCT No.: PCT/JP2018/020131
§ 371 (c)(1),
(2) Date: Nov. 14, 2019

(87) PCT Pub. No.: WO2018/221398
PCT Pub. Date: Dec. 6, 2018

(65) Prior Publication Data
US 2020/0292093 A1 Sep. 17, 2020

(30) Foreign Application Priority Data
May 31, 2017 (JP) .............................. JP2017-107764

(51) Int. Cl.
*F16K 27/02* (2006.01)
*F16K 27/00* (2006.01)
*F16K 7/12* (2006.01)

(52) U.S. Cl.
CPC ........ *F16K 27/0236* (2013.01); *F16K 27/003* (2013.01); *F16K 7/12* (2013.01)

(58) Field of Classification Search
CPC ...... F16K 27/0236; F16K 27/003; F16K 7/12; F16K 27/00
See application file for complete search history.

(56) References Cited

U.S. PATENT DOCUMENTS 4,964,432 A * 10/1990 Chou ..................... F16K 1/482
137/15.22
5,295,660 A * 3/1994 Honma ................... F16K 35/00
251/288

(Continued)

FOREIGN PATENT DOCUMENTS

CN 103732972 A 4/2014
CN 205371909 U 7/2016

(Continued)

OTHER PUBLICATIONS

Official Communication issued in International Patent Application No. PCT/JP2018/020131, dated Aug. 14, 2018, along with English translation.

(Continued)

*Primary Examiner* — Michael R Reid
(74) *Attorney, Agent, or Firm* — Greenblum & Bernstein, P.L.C.

(57) ABSTRACT

A valve device is made more compact and has improved yield strength against a bending moment. The problem is solved by a valve device including a valve body having a block shape, a casing having a tubular shape, incorporating a drive mechanism that drives a valve element that opens and closes the flow path, connected to the valve body, and extending upward from an upper surface of the valve body, and a protective member that comes into contact with the casing having a tubular shape and the valve body, and is for suppressing a stress concentration that occurs between a casing member positioned on a base portion of a casing and (Continued)

the valve body when a bending moment acts as an external force on the casing.

16 Claims, 12 Drawing Sheets

(56) References Cited

U.S. PATENT DOCUMENTS

| | | | | |
|---|---|---|---|---|
| 6,116,282 | A * | 9/2000 | Yamaji | F16K 27/003 |
| | | | | 137/613 |
| 9,625,047 | B2 * | 4/2017 | Hirose | F16K 25/005 |
| 10,634,261 | B2 * | 4/2020 | Homma | F16K 27/0236 |
| 2003/0042459 | A1 * | 3/2003 | Gregoire | F16K 27/0236 |
| | | | | 251/331 |
| 2010/0090151 | A1 * | 4/2010 | Tanikawa | F16J 3/02 |
| | | | | 251/331 |
| 2015/0152969 | A1 | 6/2015 | Yogo et al. | |

FOREIGN PATENT DOCUMENTS

| | | |
|---|---|---|
| JP | 5-99356 | 4/1993 |
| JP | 2005-149075 | 6/2005 |
| JP | 2015-175502 | 10/2015 |

OTHER PUBLICATIONS

China Official Action issued in CN Application No. 201880036391.9, dated Dec. 2, 2020.

* cited by examiner

[Fig. 1A]
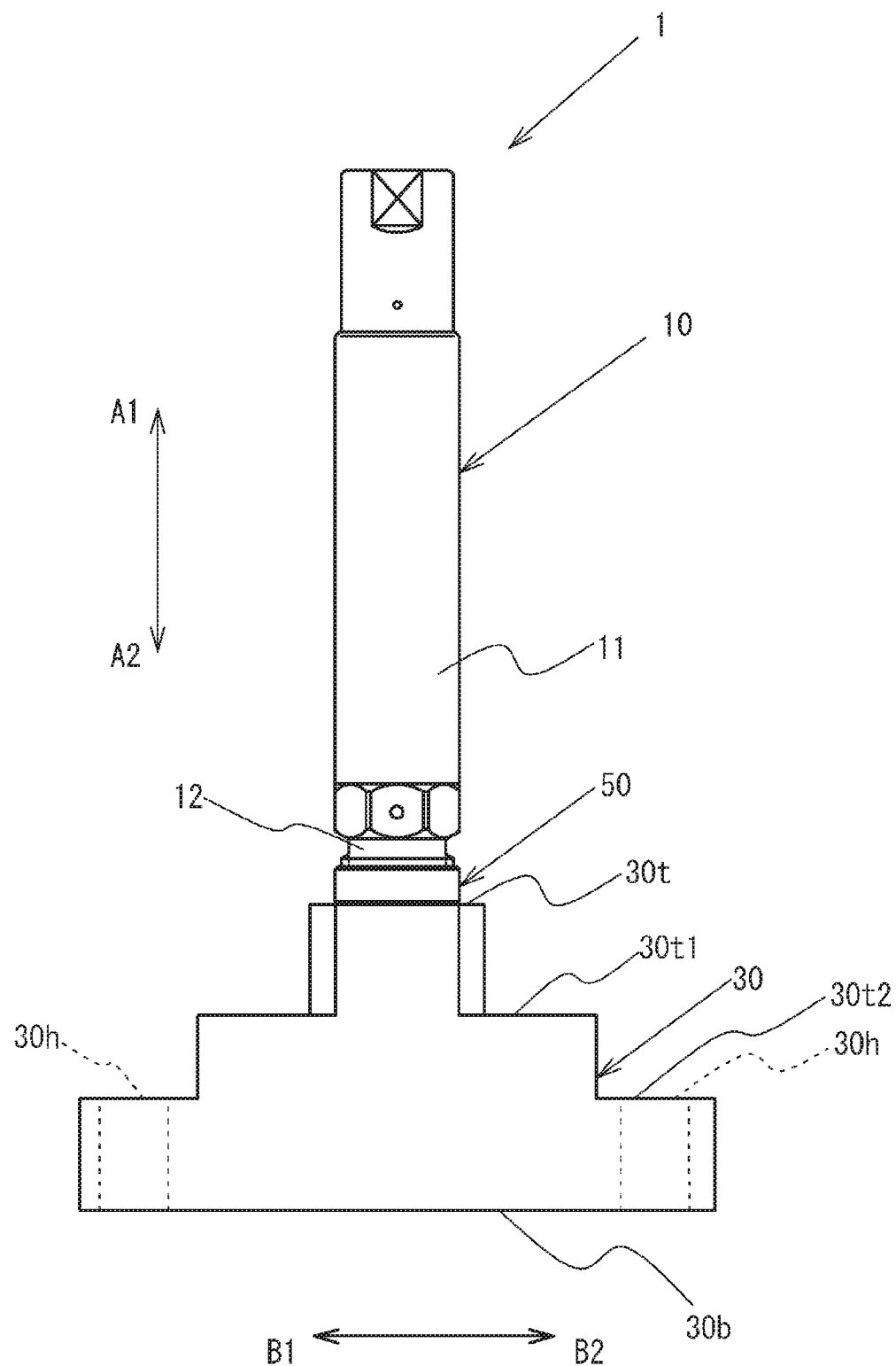

[Fig. 1B]
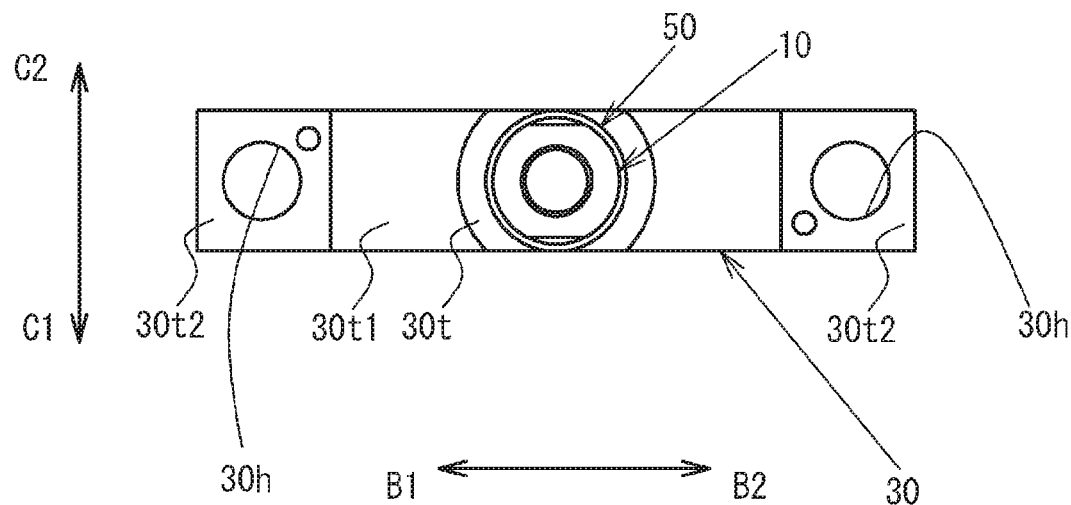
[Fig. 1C]
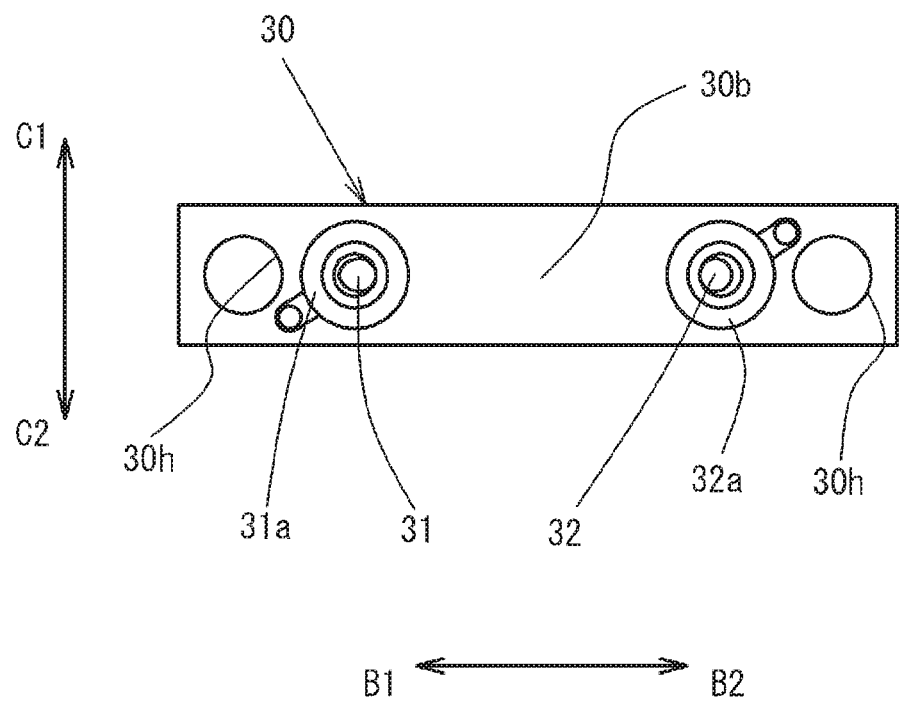

[Fig. 1D]
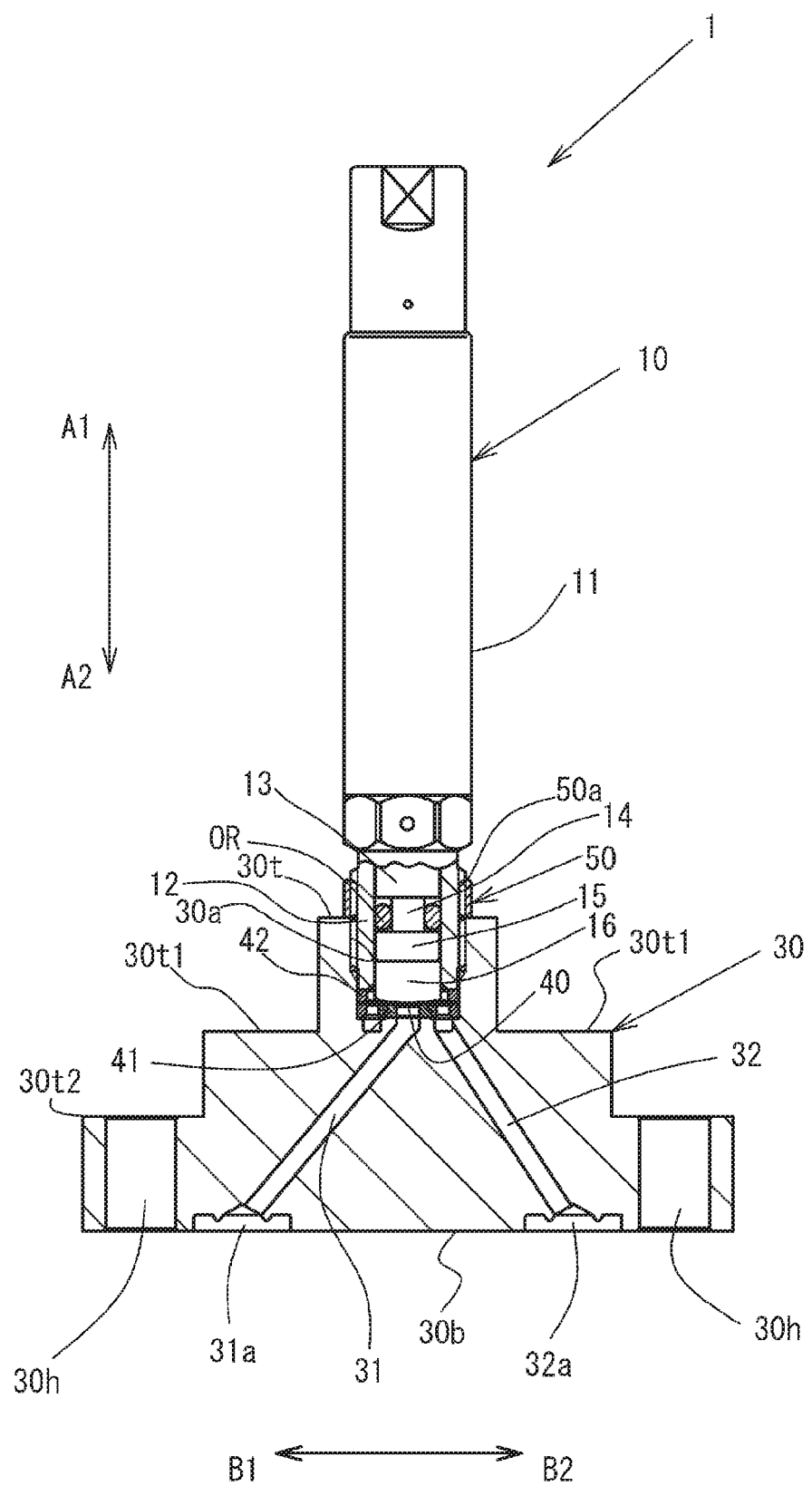

[Fig. 2]
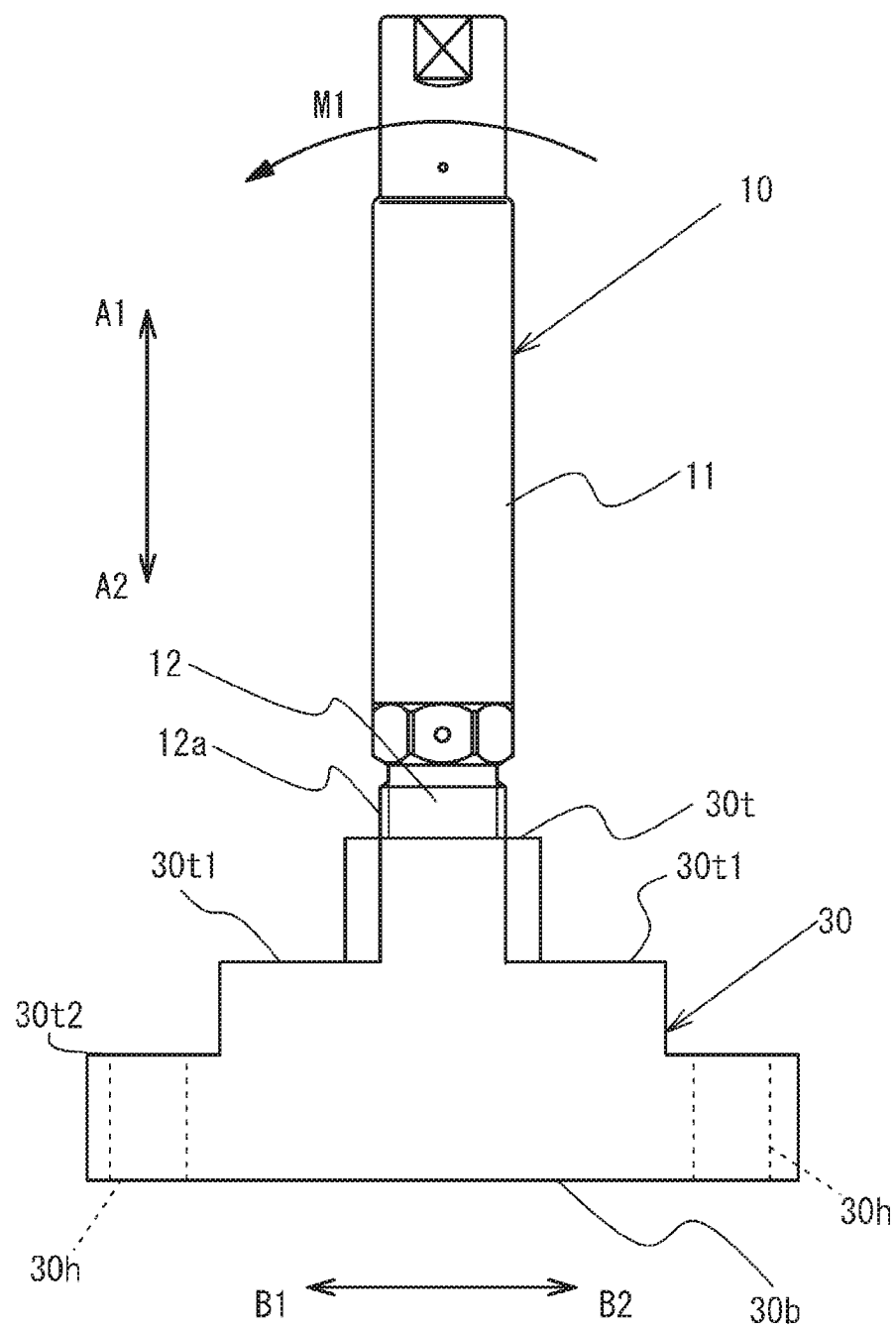

[Fig. 3A]
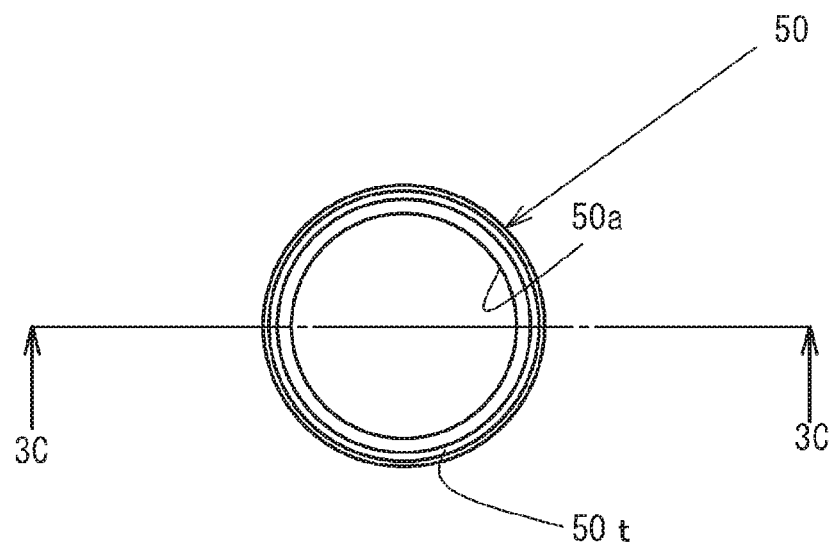
[Fig. 3B]
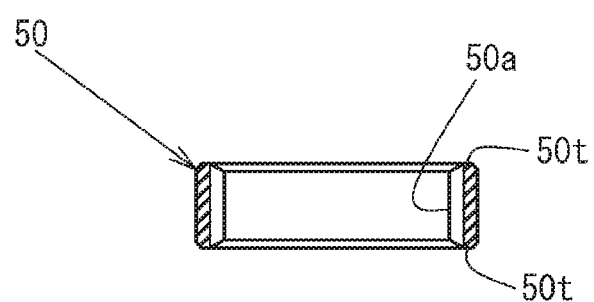

[Fig. 4]
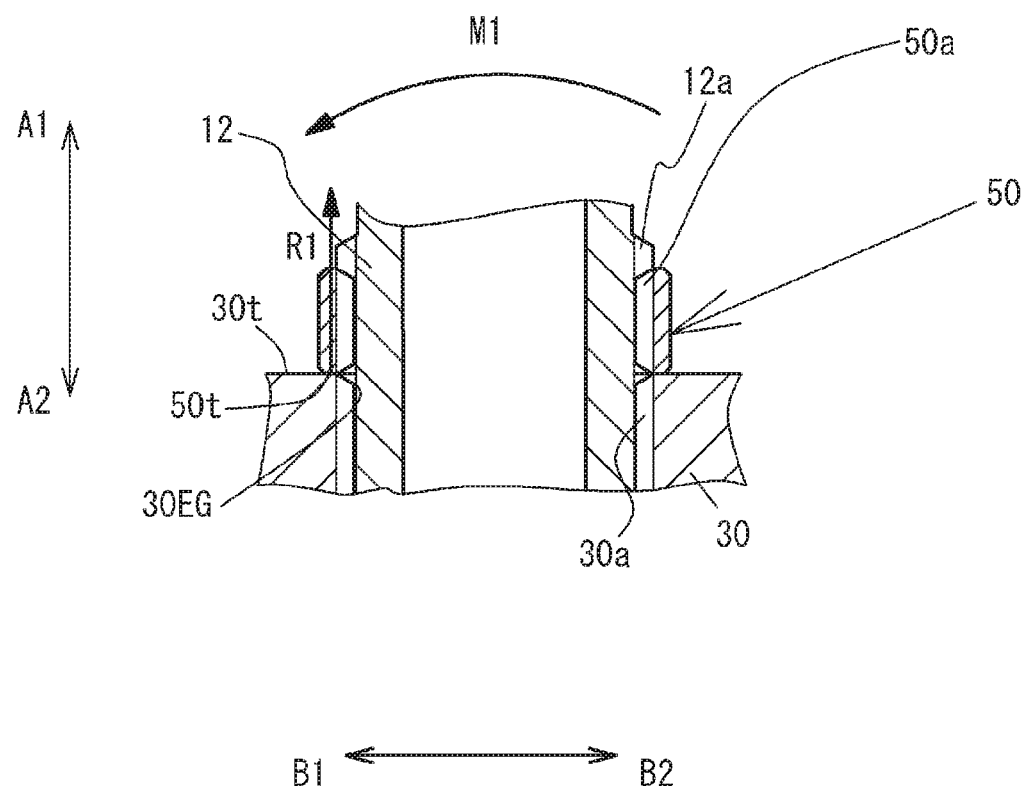

[Fig. 5]
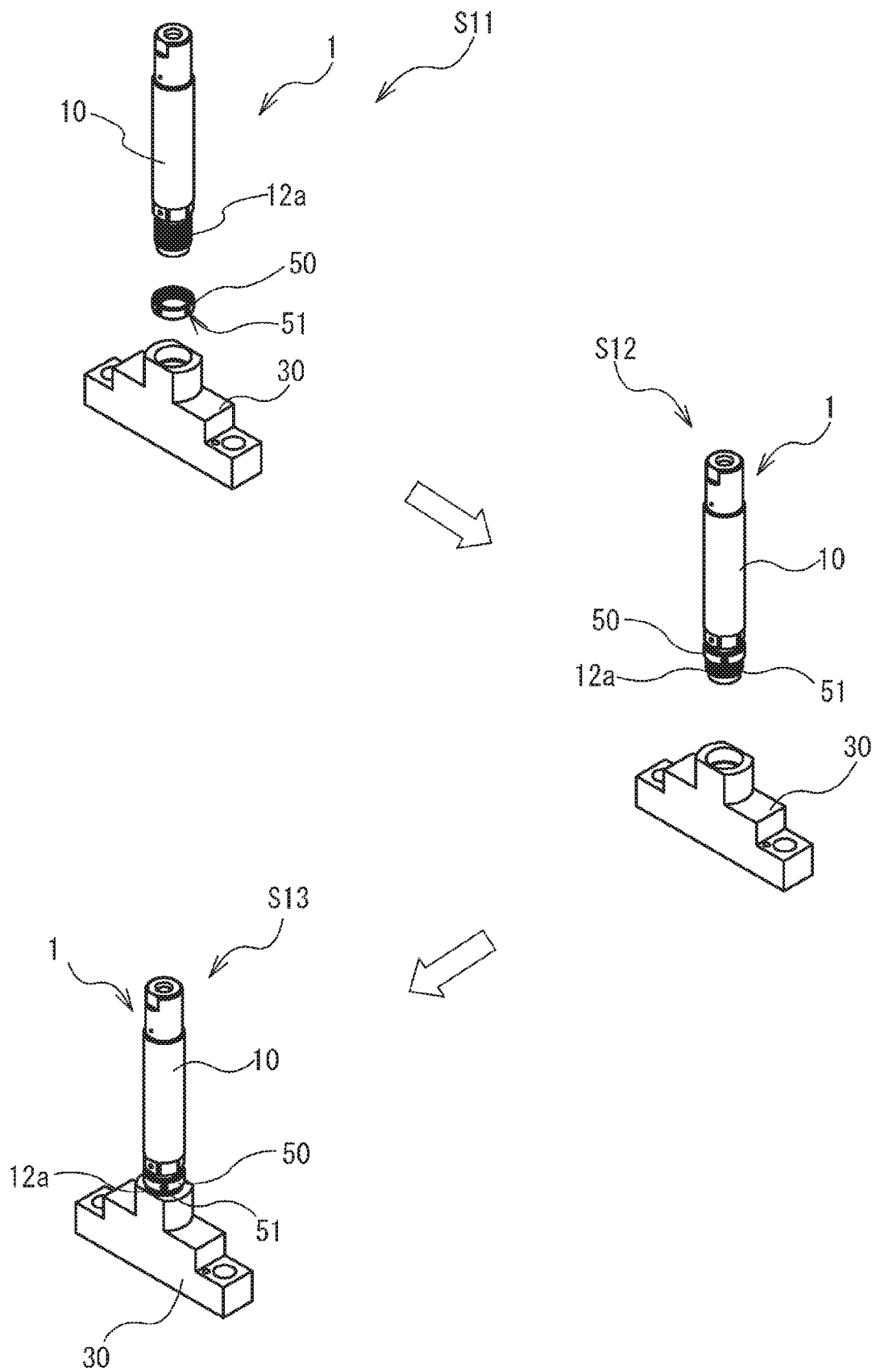

[Fig. 6]
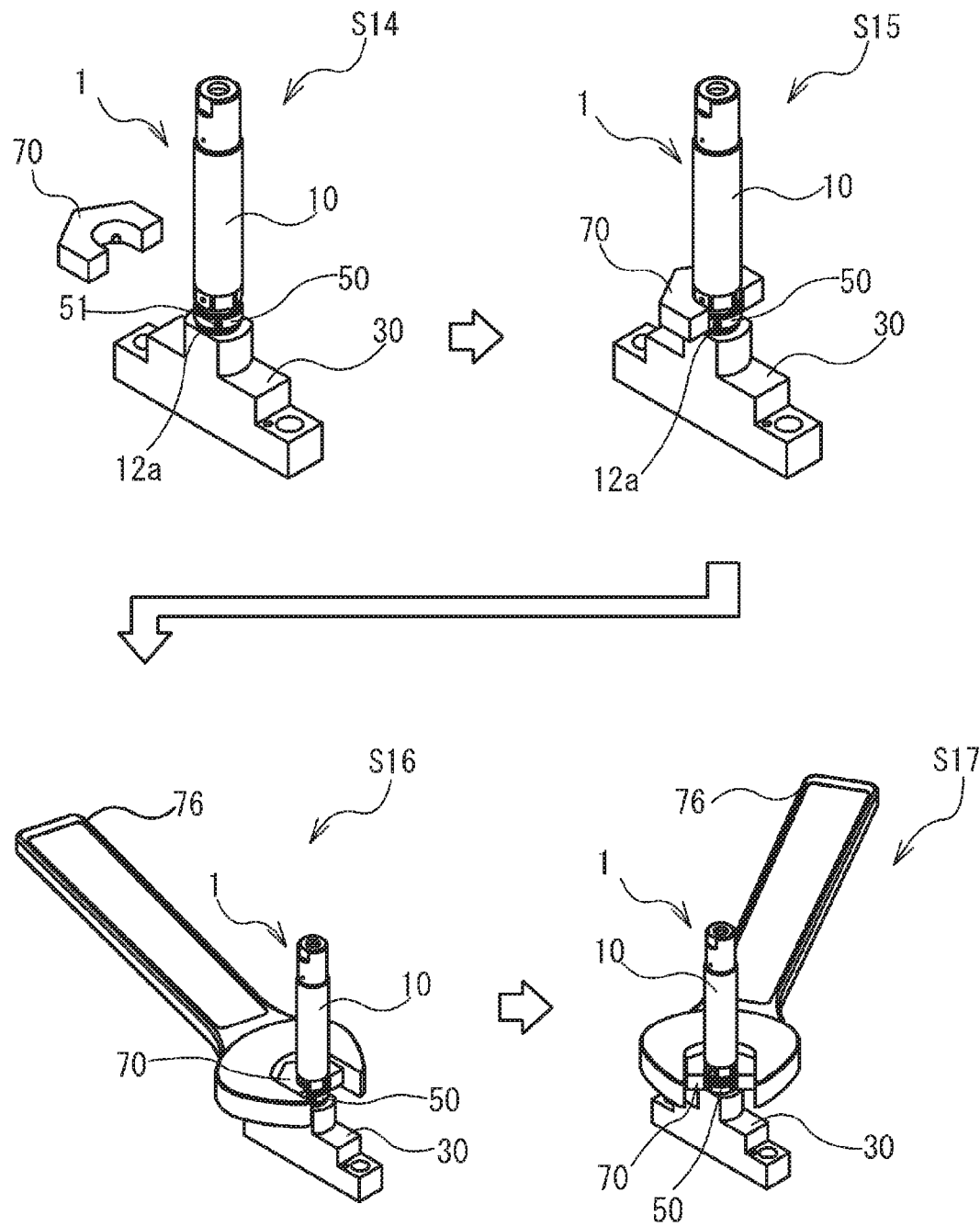

[Fig. 7A]
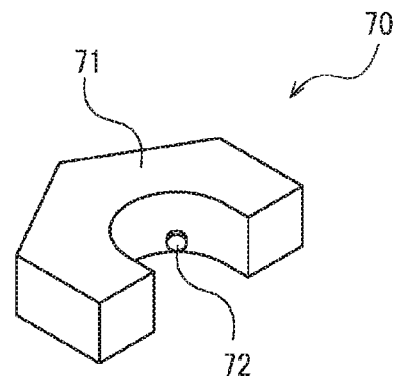
[Fig. 7B]
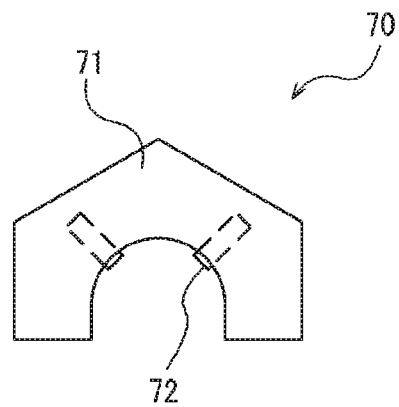
[Fig. 7C]
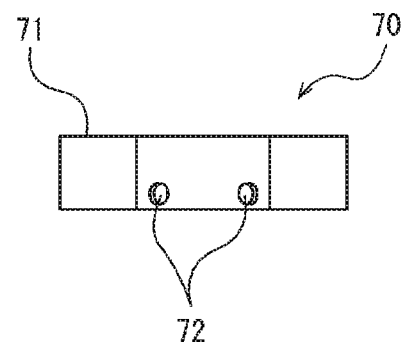

[Fig. 8]
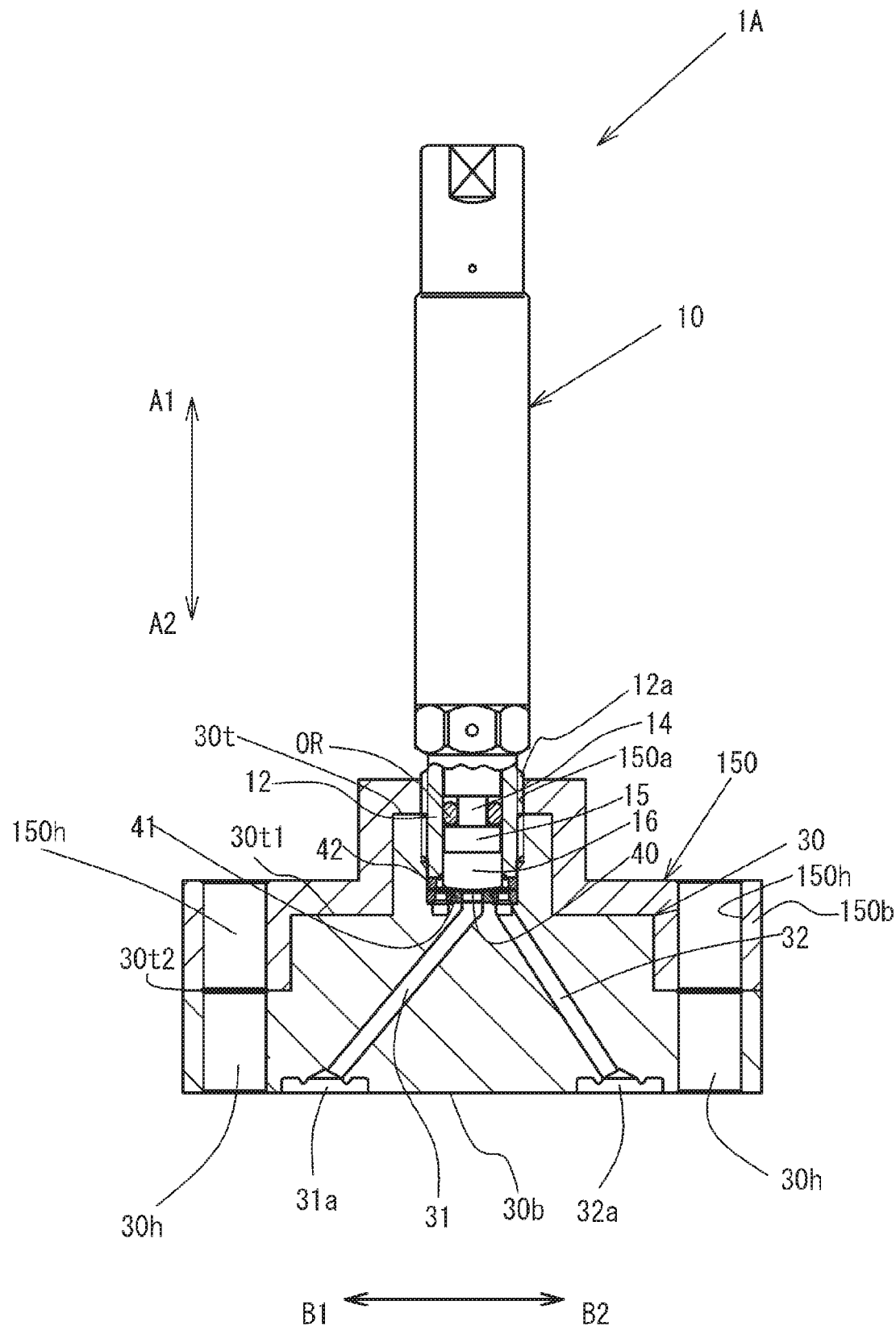

[Fig. 9A]
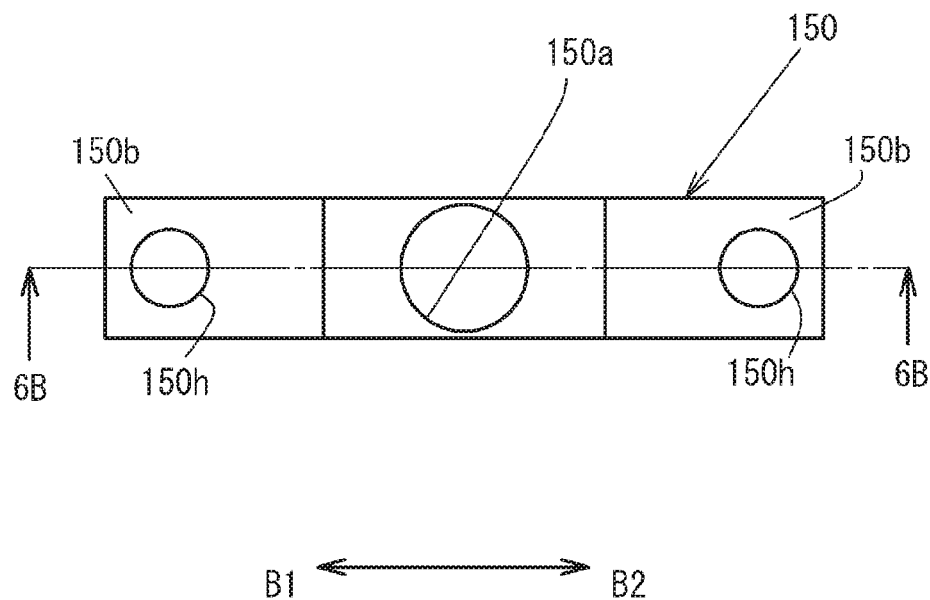
[Fig. 9B]
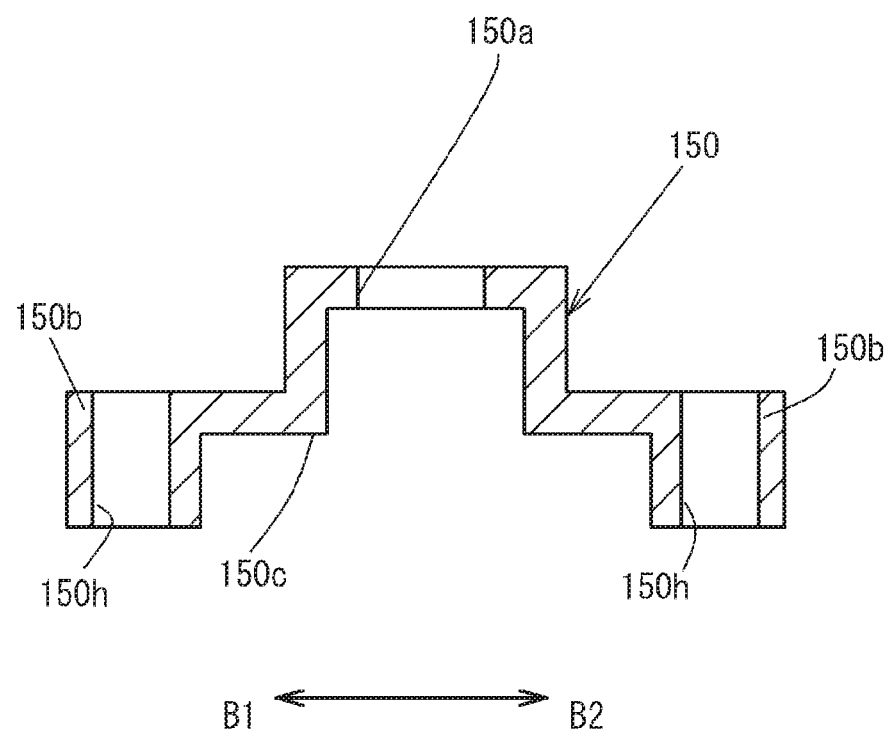

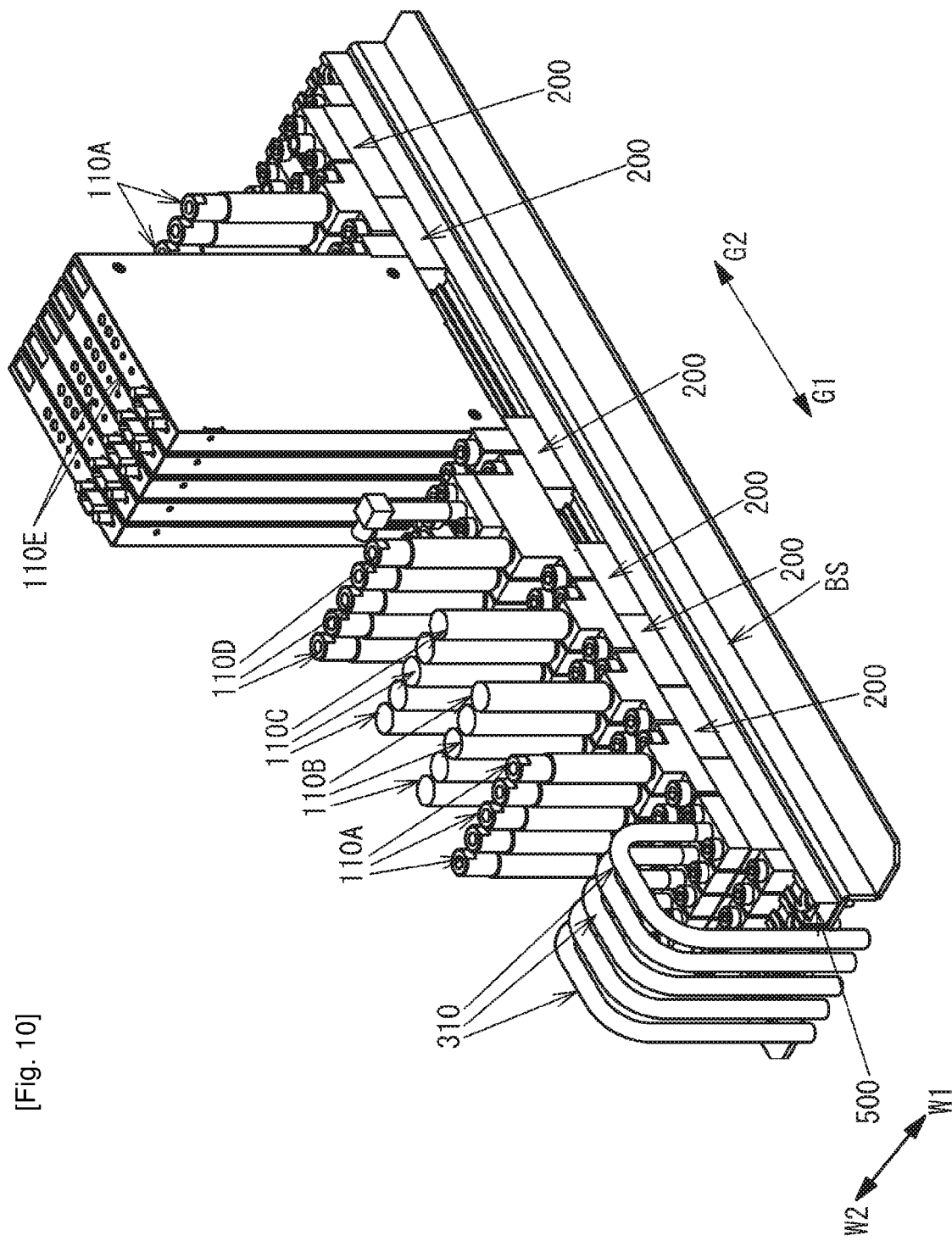
[Fig. 10]

VALVE DEVICE AND FLUID CONTROL SYSTEM

FIELD OF THE INVENTION

The present invention relates to a valve device and a fluid control system in which fluid devices including this valve device are integrated.

DESCRIPTION OF THE BACKGROUND ART

As a fluid control system used to supply various types of process gases to a chamber of a semiconductor manufacturing system or the like, there have been known, for example, the system disclosed in Patent Document 1 below, and the like.

PATENT DOCUMENTS

Patent Document 1: Japanese Laid-Open Patent Application No. 2015-175502

SUMMARY OF THE INVENTION

Problems to be Solved by the Invention

In the field of a fluid control system such as one described above, higher responsiveness is required to control the supply of the process gases. To this end, the fluid control system needs to be made more compact and integrated to the extent possible to install the system closer to the chamber that is the supply destination of the fluid.

Further, along with increase in the size of materials to be processed, such as the increase in size of the diameter of the semiconductor wafer, it becomes necessary to also increase or maintain a supply flow rate of the fluid supplied from the fluid control system into the chamber.

Thus, in a valve device used in the fluid control system such as one described above, dimensions of a valve body having a block shape and an outer diameter of a casing incorporating a drive mechanism that drives a valve element installed on the valve body are further reduced. On the other hand, in order to ensure the flow rate, it is necessary to ensure the lift amount of the valve element, such as a diaphragm, when opening and closing the valve, and thus the valve device as a whole becomes elongated.

When the valve device is made more compact and becomes relatively elongated, the problem arises that stress concentrated in the connecting part between the valve body and the casing tends to become excessive when a bending moment is applied to the valve device by operator's contact or the like.

An object of the present invention is to provide a valve device that is made more compact and has improved yield strength against a bending moment.

Another object of the present invention is to provide a fluid control system that includes the valve device described above and is made more compact and integrated.

Means for Solving the Problems

A valve device of the present invention comprises:
a valve body having a block shape, defining a bottom surface and an upper surface opposing each other, and defining a fluid flow path,
a casing having a tubular shape, incorporating a drive mechanism that drives a valve element that opens and closes the flow path, connected to the valve body, and extending upward from the upper surface of the valve body, and
a protective member that comes into contact with the casing and the valve body, and is for suppressing a stress concentration that occurs between a base portion of the casing and the valve body when a bending moment acts as an external force on the casing.

Preferably, a configuration can be adopted in which the protective member comprises an annular member fixed to an outer periphery of the base portion of the casing, and
the annular member comprises a contact end surface that comes into contact with the upper surface of the valve body while fixed to the outer periphery of the base portion of the casing.

More preferably, a configuration can be adopted in which a thread part is formed on the outer periphery of the casing,
the casing is connected to the valve body by being screwed into a screw hole formed in the valve body, and
the annular member is screwed into the thread part of the casing.

Alternatively, a configuration can be adopted in which the protective member comprises a fitting part fitted to the outer periphery of the base portion of the casing adjacent to the connecting part, and a fixing part fixable to the upper surface of the valve body.

A fluid control system of the present invention is a fluid control system comprising a plurality of fluid devices arranged from an upstream side toward a downstream side.

The plurality of fluid devices each includes the valve device having the above-described configuration.

Effect of the Invention

According to the present invention, by providing a protective member between a casing and a valve body, it is possible to improve a yield strength against a bending moment in a valve device configured compact in size and relatively elongated.

BRIEF DESCRIPTION OF THE DRAWINGS

FIG. 1A is a front view of a valve device according to an embodiment of the present invention.
FIG. 1B is a top view of the valve device in FIG. 1A.
FIG. 1C is a bottom view of the valve device in FIG. 1A.
FIG. 1D is an external perspective view of an assembly that is a portion of the fluid control system in FIG. 1A.
FIG. 2 is a diagram of the valve device in FIG. 1A from which a protective member is removed.
FIG. 3A is a top view of the protective member according to an embodiment of the present invention.
FIG. 3B is a sectional view along line 3C-3C in FIG. 3A.
FIG. 4 is a main part enlarged view for explaining an action of the protective member.
FIG. 5 is a drawing illustrating an attaching step of the protective member.
FIG. 6 is a drawing illustrating an attaching step of the protective member.
FIG. 7A is a perspective view of a jig.
FIG. 7B is a plan view of the jig in FIG. 7A.
FIG. 7C is a front view of the jig in FIG. 7A.
FIG. 8 is a front view including a cross section of the valve device according to another embodiment of the present invention.

FIG. 9A is a top view of the protective member according to another embodiment of the present invention.

FIG. 9B is a sectional view along line 6B-6B in FIG. 9A.

FIG. 10 is a perspective view illustrating an example of a fluid control system in which the present invention is applied.

DESCRIPTION OF THE PREFERRED EMBODIMENTS

Embodiments of the present invention will be described below with reference to the drawings.

First, an example of a fluid control system in which the present invention is applied will be described with reference to FIG. 10.

The fluid control system illustrated in FIG. 10 is provided with five rail members 500 arranged in width directions W1, W2 and extending in longitudinal directions G1, G2 on a base plate BS made of metal. It should be noted that W1, W2, G1, and G2 denote front side, rear side, upstream side, and downstream side directions, respectively. In each rail member 500, various fluid devices 110A to 110E are installed via a plurality of flow path blocks 200, and the plurality of flow path blocks 200 form flow paths (not illustrated) through which a fluid flows from the upstream side toward the downstream side.

Here, "fluid device" is a device used in a fluid control system for controlling a flow of a fluid, and including a body defining a fluid flow path, and at least two flow path ports that open on a surface of this body. Specifically, the fluid device includes a switch valve (two-way valve) 110A, a regulator 110B, a pressure gauge 110C, a switch valve (three-way valve) 110D, a mass flow controller 110E, and the like, but is not limited thereto. It should be noted that an introducing pipe 310 is connected to each of the flow path ports on the upstream side of the flow paths (not illustrated) described above.

When the fluid device is made more compact and integrated, the fluid device is formed more elongated overall, as understood from FIG. 10.

While the present invention is applicable to various valve devices such as the switch valves 110A, 110D, and the regulator 110B described above, a case of application to a switch valve will be described as an example in this embodiment.

FIGS. 1A to 1D are diagrams illustrating the valve device according to an embodiment of the present invention, FIG. 2 is a diagram of the valve device in FIG. 1A from which a protective member is removed, FIGS. 3A and 3B are diagrams illustrating a structure of the protective member, and FIG. 4 is a diagram for explaining an action of the protective member.

A valve device 1 includes a casing 10, a valve body 30, and a protective member 50. It should be noted that arrows A1, A2 in the drawing indicate upward and downward directions, A1 being the upward direction and A2 being the downward direction. Arrows B1, B2 indicate longitudinal directions of the valve body 30 of the valve device 1, B1 being one end side and B2 being the other end side. Arrows C1, C2 indicate width directions orthogonal to the longitudinal directions B1, B2 of the valve body 30, C1 being on a front side and C2 being on a rear side.

The valve body 30 is formed into a block shape, and defines flow paths 31, 32 for a gas or the like that open on a bottom surface 30b thereof. Holding parts 31a, 32a that have a recessed shape and hold a seal member (not illustrated) are formed around the openings of the flow paths 31, 32 on the bottom surface 30b. The flow paths 31, 32 communicate with each other via a valve chamber formed on an upper side part of the valve body 30.

As illustrated in FIGS. 1A and 1B, the valve body 30 has a rectangular shape in a top view, and an upper surface of the valve body 30 has a stepped structure including an upper surface 30t, which is the highest position on which the casing 10 is provided, an upper surface 30t1 positioned further in the downward direction A2 than the upper surface 30t, and an upper surface 30t2 positioned further in the downward direction A2 than the upper surface 30t1. A through hole 30h is formed from the upper surface 30t2 toward the bottom surface 30b in both one end side and the other end side of the longitudinal directions B1, B2. In the through hole 30h, a tightening bolt for fixing the valve body 30 on the flow path blocks 200 such as one illustrated in FIG. 10 is inserted.

As understood from FIG. 1C, outer contours of the casing 10 and the protective member 50 are within the upper surface of the valve body in a top view.

A valve seat 41 is provided around the flow path 31 inside the valve chamber of the valve body 30, as illustrated in FIG. 1D. The valve seat 41 is formed from a resin such as perfluoroalkoxyalkane (PFA) or a polytetrafluoroethylene (PTFE) in an elastically deformable manner.

A diaphragm 40 functions as a valve element, has a larger diameter than the valve seat 41, and is formed in an elastically deformable manner into a spherical shell shape by a metal such as stainless steel or an NiCo-based alloy, or a fluorine-based resin. The diaphragm 40 is supported by the valve body 30 so as to allow contact with and separation from the valve seat 41 by being pressed toward the valve body 30 by a lower end surface of a casing member 12 described later via a pressing adapter 42.

In FIG. 1D, the diaphragm 40 is in a state of being pressed by a diaphragm presser 16, elastically deformed, and pressed against the valve seat 41. When the pressing by the diaphragm presser 16 is released, the diaphragm 40 is restored into a spherical shell shape. When the diaphragm 40 is pressed against the valve seat 41, the flow path 31 is closed, and when the diaphragm presser 16 is moved in the upward direction A1, the diaphragm 40 is separated from the valve seat 41 and the flow path 31 is opened and communicates with the flow path 32.

The casing 10 is constituted by a casing member 11 having a cylindrical shape, and a casing member 12 connected to a lower end side of the casing member 11, and incorporates a drive mechanism, such as a mechanism that drives a valve element by an actuator (not illustrated) or a manual operation, in an interior. The actuator, for example, is a piston driven by compressed air, or the like, but is not necessarily limited thereto, and various actuators can be adopted, such as a piezoelectric actuator or a solenoid actuator.

The casing member 12 incorporating the drive mechanism may partially constitute the drive mechanism, or may be a separate body from the drive mechanism.

Inside the casing member 12, there is provided a movable part 13 driven in the upward and downward directions A1, A2 by a drive mechanism built into the casing 10, and a pressing member 15 coupled thereto via a shaft part 14. An O-ring OR is provided between the shaft part 14 and the casing member 12, and seals an area between the valve chamber side and the drive mechanism side. When the pressing member 15 is driven in the downward direction A2, the diaphragm 40 is pressed via the diaphragm presser 16.

As illustrated in FIG. 1D, a thread part 12a is formed on an outer periphery of the casing member 12. A screw hole 30a is formed from the upper surface 30t toward the bottom surface 30b in the valve body 30, and the thread part 12a of the casing member 12 is screwed into the screw hole 30a, thereby causing a tip end portion of the casing member 12 to be connected to the valve body 30, and causing the tip end part to press down the pressing adapter 42. As illustrated in FIG. 2, a portion of the thread part 12a above the upper surface 30t is externally exposed from the valve body 30 as a base portion of the casing 10. In the present embodiment, the protective member 50 described later is provided to a portion of the thread part 12a of the casing member 12 externally exposed from the valve body 30.

Here, as illustrated in FIG. 2, without the protective member 50 provided to the outer periphery of the casing member 12, when a bending moment M1 acts on the casing 10, stress concentrates between the base portion of the casing member 12 and an opening end of the screw hole 30a of the valve body 30. In particular, even if an outer diameter of the casing 10 and dimensions of the valve body 30 are reduced, when an overall length of the casing 10 is relatively long, the stress concentration described above may exceed a yield strength.

Thus, in the present embodiment, the protective member 50 is fixed to an outer periphery of the base portion of the casing member 12.

As illustrated in FIGS. 3A and 3B, the protective member 50 is configured by an annular member made of a metal, and has a vertically symmetrical shape. A thread part 50a to be screwed into the thread part 12a of the casing member 12 is formed on an inner periphery of the protective member 50. Further, both end surfaces of the protective member 50 are contact end surfaces 50t, which is a flat surface, and one of the contact end surfaces 50t can come into contact with the upper surface 30t of the valve body 30 as described later. Since the contact end surface 50t is configured as a flat surface, the contact end surface 50t can come into full contact with the upper surface 30t of the valve body 30. A plurality of recessed parts 51 (refer to FIGS. 5 and 6) is opened on a side surface of the protective member 50, and the protective member 50 can be turned using a wrench by attaching a jig 70 as described later. This recessed part 51 may penetrate through the protective member 50, or may include a bottom to such a depth that a protrusion 72 provided on the jig 70 does not come into contact therewith.

The protective member 50 illustrated in FIGS. 3A and 3B is chamfered at a circumferential corner part of the end surface. However, in order to increase the area of the contact end surface 50t and the area of contact with the upper surface 30t, the size of the chamfer is preferably small.

As illustrated in FIG. 4, the protective member 50 is fixed between the casing member 12 and the valve body 30 by being brought into contact with the upper surface 30t of the valve body 30 while being screwed into the thread part 12a on the outer periphery of the casing member 12. It should be noted that the valve body 30 is fixed on the flow path block 200 by using the through hole 30h.

In this state, as described above, when the bending moment M1 acts on the casing 10, stress concentrates on the base portion of the casing member 12 and an opening end 30EG of the screw hole 30a of the valve body 30. At the same time, the contact end surface 50t of the protective member 50 in contact with the upper surface 30t of the valve body 30 receives a reaction force R1 from the upper surface 30t of the valve body 30. With this reaction force R1, the stress concentration that occurs between the base portion of the casing member 12 and the opening end 30EG of the screw hole 30a of the valve body 30 is relaxed and prevented from becoming excessive. As a result, the stress between the base portion of the casing member 12 and the opening end 30EG of the screw hole 30a of the valve body 30 is less likely to exceed the yield strength. That is, resistance to the bending moment M1 of the valve device 1 is improved.

FIGS. 5 and 6 are drawings illustrating an example of an attaching step of the protective member 50. First, as illustrated in FIG. 5, in step S11, the casing 10, the valve body 30, and the protective member 50 are prepared and, in step S12, the protective member 50 is screwed into the thread part 12a of the casing member 12. In step S13, the thread part 12a is screwed into the screw hole 30a of the valve body 30, and the casing 10 and the valve body 30 are tightly fixed. Next, in step S14 in FIG. 6, the protective member 50 screwed into the thread part 12a is turned and lowered until in contact with the upper surface 30t of the valve body 30, and subsequently the jig 70 is prepared.

FIGS. 7A to 7C are a perspective view, a plan view, and a front view of the jig 70, respectively. As illustrated in these drawings, the jig 70 has an overall shape like a nut cut in half, has no screw grooves on an inner peripheral surface, and has a pair of protrusions 72 disposed at a predetermined interval on the inner peripheral surface. The protrusions 72 may be formed by fitting a pin into a hole opened in a jig main body 71. At this time, an outer diameter dimension of the protrusion 72 is configured sufficiently smaller than an inner diameter dimension of the recessed part 51 so that the jig 70 can be easily fitted to the protective member 50.

When the two protrusions 72 are provided as illustrated in FIGS. 7A to 7C, preferably the two protrusions 72 are provided in positions in which, in a state of use of the jig 70, extended lines of the axes of the protrusions 72 cross at an angle of 90 degrees at a center of the annular member of the protective member 50.

Returning to FIG. 6, in step S15, the jig 70 is attached so that the protrusions 72 of the jig 70 are fitted into the recessed parts 51 of the protective member 50. In steps S16 and S17, the protective member 50 is rotated together with the jig 70 by a wrench 76, and firmly brought into contact with the upper surface 30t of the valve body 30 and fixed.

Further, instead of using the jig 70 and the wrench 76, a shaft member having the same diameter as the protrusion 72 can also be directly fitted to the recessed parts 51 to rotate the protective member 50.

While the protective member 50 has an annular shape in the present embodiment, the outer shape is not limited to being circular as long as the shape is annular. However, the outer contour of the protective member 50 needs to be within the upper surface 30t of the valve body 30.

Further, while a configuration is adopted in which the protective member 50 is fixed by screwing, other alternatives such as caulking or welding can also be adopted.

Second Embodiment

FIG. 8 illustrates a valve device 1A according to a second embodiment of the present invention. It should be noted that the same components as those in the embodiment described above are denoted using the same reference numerals.

In the present embodiment, the structure of a protective member 150 differs from that of the protective member 50 described above.

As illustrated in FIGS. 9A and 9B, the protective member 150 has a rectangular outer shape in a top view, and includes a fitting part 150a that is formed of a through hole at substantially the center in the longitudinal directions B1, B2, and fitted to the outer periphery of the base portion of the casing member 12. Further, the protective member 150 includes fixing parts 150b for fixing the protective member 150 to the upper surfaces 30t, 30t1, 30t2 of the valve body on one end side and the other end side in the longitudinal direction, and a through hole 150h is formed in each of these two fixing parts. As illustrated in FIG. 8, the through hole 150h is aligned with the through hole 30h of the valve body 30, and a common tightening bolt (not illustrated) can be inserted into the through holes 30h, 150h. Furthermore, the protective member 150 is formed so as to substantially match the outer shape of the upper surface formed by the upper surfaces 30t, 30t1, 30t2 of the valve body 30. In addition, the shape of the protective member 150 on a lower surface 150c side is formed to match the stepped shape of the upper surface of the valve body 30.

In the state illustrated in FIG. 8, when a bending moment such as one described in the above-described embodiment acts on the casing 10, a reaction force against the bending moment acts on the casing member 12 from an inner peripheral surface of the fitting part 150a of the protective member 150. As a result, the magnitude of stress concentrated between the base portion of the casing member 12 and the valve body 30 is relaxed. That is, resistance to the bending moment of the valve device 1A is improved.

While a structure is adopted in which the protective member 150 is fixed using the through holes 30h of the valve body 30 in the present embodiment, the protective member 150 can also be directly fixed to the valve body 30.

While the valve device is mounted on the plurality of flow path blocks 200 in the fluid control system in the above-described embodiment, instead of the divided-type flow path blocks 200, the valve device of the present invention can be applied to integrated monolithic-type flow path block and a flow path plate as well.

While a device that automatically opens and closes by an actuator is illustrated as the valve device of the present invention in the above-described embodiment, the present invention is not necessarily limited thereto, and may be applied to a manual valve.

DESCRIPTIONS OF REFERENCE NUMERALS

1 Valve device
10 Casing
11, 12 Casing member (Casing)
30 Valve body
50 Protective member
50t Contact end surface
51 Recessed part
150 Protective member
150a Fitting part
150b Fixing part
150h Through hole
110A Switch valve (Two-way valve) (Valve device)
110B Regulator (Valve device)
110C Pressure gauge (Fluid device)
110D Switch valve (Three-way valve) (Valve device)
110E Mass flow controller (Fluid device)

What is claimed is:

1. A valve device comprising:
a valve body having a block shape, defining a bottom surface and an upper surface opposing each other, and defining a fluid flow path;
a diaphragm being able to open and close the fluid flow path;
a casing having a tubular shape and a thread part formed on an outer periphery thereof, incorporating a drive mechanism for driving the diaphragm, connected to the valve body, and extending upward from the upper surface of the valve body, the thread part being screwed into a screw hole formed in the valve body so as to connect the casing to the valve body and to press an outer periphery of the diaphragm with a lower end portion of the casing to fix the diaphragm on the valve body; and
a protective member that comes into contact with the casing and the valve body while the protective member is fixed to the outer periphery of a base portion of the casing, the protective member having a contacting end surface in contact with the upper surface of the valve body, wherein the protective member is configured to suppress a stress concentration that occurs between the base portion of the casing and the valve body when a bending moment acts as an external force on the casing.

2. The valve device according to claim 1, wherein an outer contour of the casing and the protective member are within the upper surface of the valve body in a top view.

3. The valve device according to claim 1, wherein the protective member is screwed into the thread part of the casing.

4. The valve device according to claim 1, wherein the protective member comprises a fitting part fitted to an outer periphery of the base portion of the casing, and a fixing part fixable to the upper surface of the valve body.

5. The valve device according to claim 4, wherein outermost contours of the casing and the protective member are within the upper surface of the valve body in a top view.

6. The valve device according to claim 4, wherein the valve body comprises a through hole formed on each of one end side and the other end side in a longitudinal direction, the through hole being for a tightening bolt for tightening the valve body to another member, and the fixing part of the protective member comprises a through hole configured to be aligned with the above through hole when the fitting part is fitted to the outer periphery of the base portion of the casing.

7. The valve device according to claim 1, wherein the protective member comprises a recessed part on a side surface of the protective member.

8. A fluid control system comprising a plurality of fluid devices arranged from an upstream side toward a downstream side,
wherein the plurality of fluid devices include the valve device of claim 1.

9. A fluid control system comprising a plurality of fluid devices arranged from an upstream side toward a downstream side, wherein the plurality of fluid devices include the valve device of claim 2.

10. A fluid control system comprising a plurality of fluid devices arranged from an upstream side toward a downstream side, wherein the plurality of fluid devices include the valve device of claim 3.

11. A fluid control system comprising a plurality of fluid devices arranged from an upstream side toward a downstream side, wherein the plurality of fluid devices include the valve device of claim 4.

12. A fluid control system comprising a plurality of fluid devices arranged from an upstream side toward a downstream side, wherein the plurality of fluid devices include the valve device of claim 5.

13. A fluid control system comprising a plurality of fluid devices arranged from an upstream side toward a downstream side, wherein the plurality of fluid devices include the valve device of claim 6.

14. The valve device according to claim 1, wherein: the fluid flow path is through the bottom surface of the valve body.

15. A valve device comprising:
- a valve body having a block shape, defining a bottom surface and an upper surface opposing each other, and defining a fluid flow path;
- a casing having a tubular shape, incorporating a drive mechanism for driving a valve element that opens and closes the flow path, connected to the valve body, and extending upward from the upper surface of the valve body; and
- a protective member that comes into contact with the casing and the valve body, and is for suppressing a stress concentration that occurs between a base portion of the casing and the valve body when a bending moment acts as an external force on the casing, wherein the protective member comprises a fitting part fitted to an outer periphery of the base portion of the casing, and a fixing part fixable to the upper surface of the valve body, and the valve body comprises a through hole formed on each of one end side and the other end side in a longitudinal direction, the through hole being for a tightening bolt for tightening the valve body to another member, and the fixing part of the protective member comprises a through hole configured to be aligned with the above through hole when the fitting part is fitted to the outer periphery of the base portion of the casing.

16. A fluid control system comprising a plurality of fluid devices arranged from an upstream side toward a downstream side, wherein the plurality of fluid devices include the valve device of claim 15.

* * * * *